G. HEDRICH.
MACHINE FOR CUTTING CHENILLE.
APPLICATION FILED SEPT. 12, 1911.
1,042,553.
Patented Oct. 29, 1912.
3 SHEETS—SHEET 2.
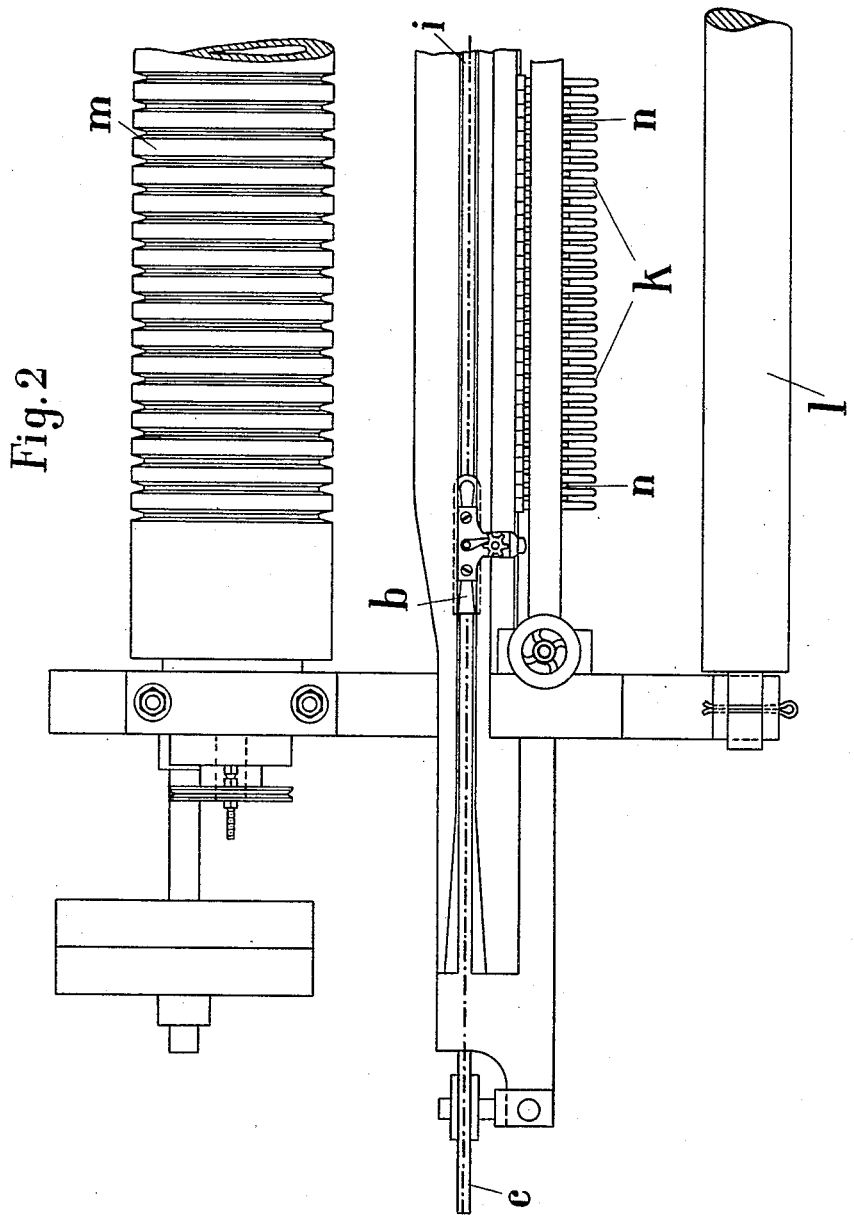
WITNESSES
Chas. J. Wright
L. Nufer
INVENTOR
Gustav Hedrich G. HEDRICH.
MACHINE FOR CUTTING CHENILLE.
APPLICATION FILED SEPT. 12, 1911.
1,042,553.
Patented Oct. 29, 1912.
3 SHEETS—SHEET 3.
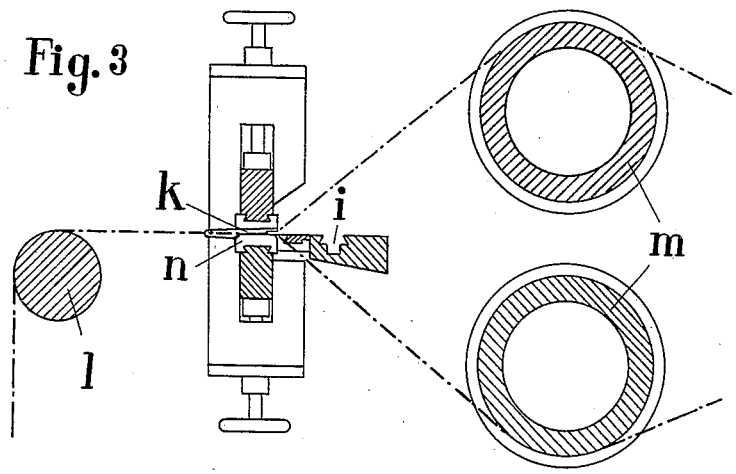
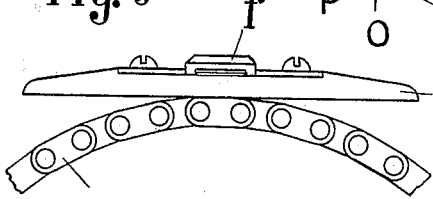
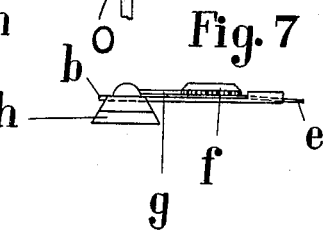
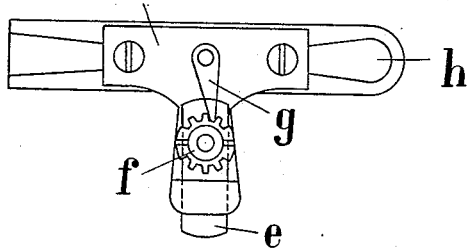
WITNESSES
Chas. J. Wright
L. Nufer
INVENTOR
Gustav Hedrich

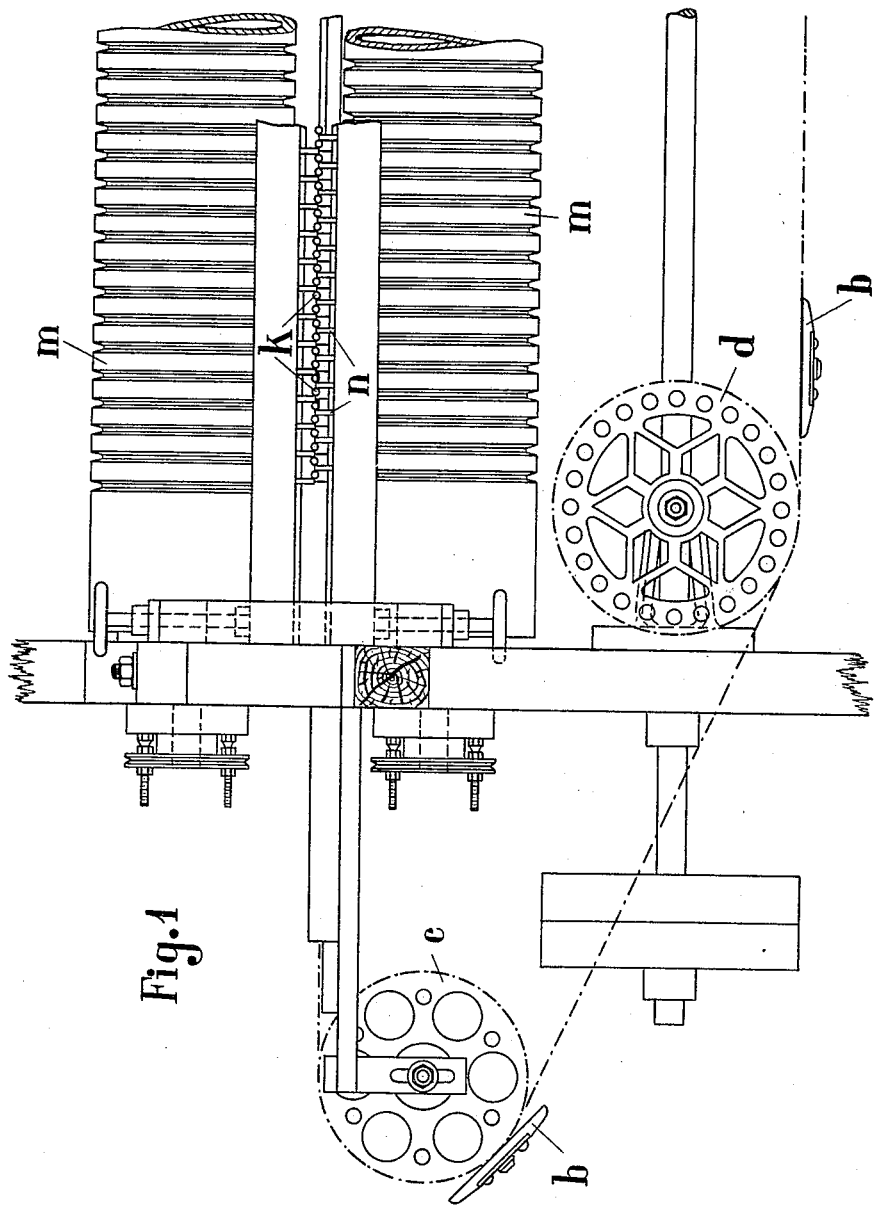

UNITED STATES PATENT OFFICE.

GUSTAV HEDRICH, OF BARMEN, GERMANY.

MACHINE FOR CUTTING CHENILLE.

1,042,553.   Specification of Letters Patent.   Patented Oct. 29, 1912.

Application filed September 12, 1911. Serial No. 648,919.

*To all whom it may concern:*

Be it known that I, GUSTAV HEDRICH, technical instructor, residing at 34 Meckelstrasse, Barmen, Prussia, Germany, have invented certain new and useful Improvements in Machines for Cutting Chenille, of which the following is a specification.

The invention relates to means for cutting chenille bands or fabric, such as described in my United States Patent No. 954,470.

In the accompanying drawings, Figure 1 illustrates the machine in a front view; Fig. 2 in plan view of same, Fig. 3, a vertical section, showing the travel of the goods; Fig. 4, a detail view looking toward the mandrels and illustrating the method of separating and cutting the threads; Fig. 5, a detail side view of a knife and its mounting; Fig. 6, a plan view thereof; and Fig. 7, an edge view thereof.

The main characteristic of the invention is the fact that the fabric is cut by means of knives in the direction of the weft, the knives being secured to an endless chain, rope or band, and so moved thereby as to penetrate through and cut the fabric which is continually fed to them.

The machine shown in the accompanying drawing operates in the following manner: On a chain $a$ (indicated in Figs. 1 and 2 by broken lines) are arranged, at certain distances apart, knife holders $b$ (Figs. 5 to 7) so arranged as not to impede the movement of the chain around the guide rollers $c$, $d$, as shown in Fig. 1. The rollers, of which others are also arranged at the right hand side of the machine, are so located that the chain $a$ is passed at the top in a straight line over a guide $i$ which is provided with a dovetailed recess to receive a correspondingly shaped support $h$ carrying the knife clip or holder $b$. The knife $e$ is secured in the clip by means of a toothed nut $f$ which is prevented from becoming loose by means of a pawl $g$.

By means of the chain the knives are carried past a series of conically shaped mandrels $k$ over which the tubular chenille fabric is guided in the manner shown in Figs. 3 and 4. As shown in Fig. 3, the material is fed over a beam $l$ toward the mandrels $k$, where it is cut and then separated to form the individual pile strips or bands, whence it is guided over grooved rollers $m$ $m$ toward the reel.

Fig. 4 illustrates the operation of the mandrels $k$. They are destined to enter the tubular fabric and to spread apart the upwardly and downwardly directed weft portions. Arranged between the mandrels $k$ are brackets $n$ $n$ adapted to act as supports for the severed parts $o$ of the material (Fig. 4). The knives travel in the direction of the full line $x$ (Fig. 4) through slots $p$ in the mandrels $k$, and alternately above and below the warp binding threads and cut the wefts in such manner that the long tufts are pressed upward and downward under the action of the twist of the binding warp threads, so that short weft portions remain between the long pile tufts. The rollers $m$ $m$ are grooved (Figs. 1 and 2) thereby enabling the tufts of the chenille guided above them to enter the grooves and to stand upright.

The described cutting device may be arranged directly on the weaving loom for making the preliminary chenille bands. In most cases, however, it will be advisable to construct the cutting machine as an independent device, as it is then possible to operate it quickly and enable a cutting machine of this kind to cut the products of several looms.

What I desire to claim and secure by Letters Patent is:

1. Chenille cutting mechanism comprising an endless conveyer, independent knives mounted on said conveyer, and slotted mandrels through which said knives pass when in motion, substantially as set forth.

2. Chenille cutting mechanism comprising an endless conveyer, independent holders on said conveyer, independent knives mounted on said holders, guides for said holders and slotted mandrels through which said knives pass when in motion, substantially as set forth.

3. Chenille cutting mechanism comprising an endless conveyer, independent knife holders on said conveyer, independent knives mounted on said holders, guides for said holders, slotted mandrels through which said knives pass when in motion, and alternately upper and lower supports between the mandrels substantially as set forth.

4. Chenille cutting mechanism embodying means for opening up or spreading apart the weft portions of the chenille fabric, means affording alternately raised and depressed binding points for the fabric, and a cutter adapted to travel in a line alternately above and below the warp binding threads, whereby the weft threads are cut and pressed upward and downward by the action of the twist of the binding warp threads.

In testimony whereof I affix my signature in presence of two witnesses.

GUSTAV HEDRICH. [L. S.]

Witnesses:
   CHAS. J. WRIGHT,
   L. NUFER.

Copies of this patent may be obtained for five cents each, by addressing the "Commissioner of Patents, Washington, D. C."